(12) United States Patent
Horton et al.

(10) Patent No.: US 8,514,921 B2
(45) Date of Patent: Aug. 20, 2013

(54) ASSESSING AIRCRAFT INTERFERENCE PATH LOSS EMPLOYING DISCRETE FREQUENCY STIRRING

(75) Inventors: Nathaniel Thomas Horton, Burien, WA (US); Kenneth Patrick Kirchoff, Redmond, WA (US); Dennis Michael Lewis, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 1400 days.

(21) Appl. No.: 12/174,426

(22) Filed: Jul. 16, 2008

(65) Prior Publication Data
US 2010/0014571 A1  Jan. 21, 2010

(51) Int. Cl.
| H04B 3/46 | (2006.01) |
| H04B 17/00 | (2006.01) |
| H04Q 1/20 | (2006.01) |

(52) U.S. Cl.
USPC ......... 375/227; 375/228; 375/284; 455/67.14

(58) Field of Classification Search
USPC ..................... 375/227, 228, 284; 455/67.14
See application file for complete search history.

(56) References Cited

U.S. PATENT DOCUMENTS

| 5,327,091 | A * | 7/1994 | Loughry ........................ 324/627 |
| 5,530,412 | A * | 6/1996 | Goldblum ..................... 333/232 |
| 2004/0086054 | A1 * | 5/2004 | Corral .......................... 375/260 |
| 2004/0096054 | A1 * | 5/2004 | Nuovo ..................... 379/433.01 |
| 2004/0098745 | A1 * | 5/2004 | Marston et al. ................. 725/73 |
| 2004/0134904 | A1 * | 7/2004 | Clemen, Jr. ................... 219/709 |
| 2005/0091025 | A1 | 4/2005 | Wilson et al. |
| 2005/0138586 | A1 | 6/2005 | Hoppe et al. |
| 2006/0085774 | A1 | 4/2006 | Moorby |
| 2008/0126066 | A1 | 5/2008 | Zhu et al. |
| 2008/0127756 | A1 * | 6/2008 | Horton et al. ................... 73/866 |
| 2009/0303141 | A1 * | 12/2009 | Kosdikian et al. ............ 343/703 |
| 2010/0233969 | A1 * | 9/2010 | Frolik et al. ............... 455/67.14 |

OTHER PUBLICATIONS

Hatfield, M., "Eletromagnetic Reverberation Characteristics of a Large Transport Aircraft", Jul. 1994, NSWCDD/TR-93/339.*
Rimbey et al., "Mode-Stirred Transfer Function Tests and HIRF Analysis on an Airframe Testbed", pp. 1-151, Jul. 8, 1994.
Dosch et al., "757-300 Radiated Transfer Function Test Report", pp. 1-232, Feb. 3, 1999.
Singleton et al., "767-400ER Radiated Transfer Function Test Plan", pp. 1-86, Nov. 29, 1999.
Crawford et al., "Band-Limited, White Gaussian Noise Excitation for Reverberation Chambers and Applications to Radiated Susceptibility Testing", pp. 1-112, Jan. 1996.

(Continued)

*Primary Examiner* — Shuwang Liu
*Assistant Examiner* — Sung Ahn
(74) *Attorney, Agent, or Firm* — Yee & Associates, P.C.

(57) ABSTRACT

A method for accessing aircraft interference path loss in an aircraft. A plurality of radio frequency signals that are stepped through a plurality of frequencies in a frequency range is transmitted from a plurality of locations within an interior of the aircraft. Radio frequency signals present at a receive antenna are received in response to transmitting the plurality of radio frequency signals to form a plurality of measurements. An average of averages curve is generated from the plurality of measurements. A peak to average ratio is identified. Field uniformity is identified. A standard error for the average of averages curve is determined. An upper bound for the aircraft interference path loss in the aircraft is predicted using the average of averages curve, the peak to average ration, the field uniformity, and the standard error.

10 Claims, 15 Drawing Sheets

(56) References Cited

OTHER PUBLICATIONS

Hill et al., "Electromagnetic Theory of Reverberation Chambers", pp. 1-61, Dec. 1998.

Hill et al., "Aperture Excitation of Electrically Large, Lossy Cavities", pp. 1-76, Sep. 1993.

Kolbl et al., "Symbolic RTL Simulation", Proc. 38th Conference on Design Automation, 2001, pp. 47-52.

Loughry et al., "Frequency Stirring: An Alternative Approach to Mechanical Mode-Stirring for the Conduct of Electromagnetic Susceptibility Testing", Phillips Laboratory Technical Note PL-TR-91-1036, pp. 1-57, Nov. 1991.

EP search report dated Jun. 6, 2013 regarding application 09251660.8-1855/2146441, reference P108024EP00, applicant The Boeing Company, 7 pages.

Hatfield et al., "Reverberation Characteristics of a Large Welded Steel Shielded Enclosure," 1997 IEEE International Symposium on Electromagnetic Compatibility, Aug. 1997, pp. 28-43.

Diaz et al., "Wideband Channel Characterization for Wireless Communications Inside a Short Haul Aircraft," Proceedings of the 2004 IEEE 29th Vehicular Technology Conference, vol. 1, May 2004, pp. 223-228.

* cited by examiner

ASSESSING AIRCRAFT INTERFERENCE PATH LOSS EMPLOYING DISCRETE FREQUENCY STIRRING

BACKGROUND INFORMATION

1. Field

The present disclosure relates generally to identifying interference path loss and in particular to a method and apparatus for identifying interference path loss associated with an aircraft. Still more particularly, the present disclosure relates to a method and apparatus for statistically identifying interference path loss associated with the transmission of radio frequency signals within an interior of an aircraft using discrete frequency stirring.

2. Background

In designing and manufacturing aircraft, reverberant environment measurement methods are used to identify the interference path loss of radio frequency signals from within an aircraft. The interference path loss is defined as the ratio of the radio frequency power at the aircraft communication, navigation or surveillance receiver input to the transmitted radio frequency power measured at the output of the transmitter connector at the reference antenna terminals. The ratio of radio frequency power as described is the attenuation, or path loss of the radio frequency signal from within an aircraft to the front end of the receiver as measured through an aircraft antenna located outside of the aircraft. A radio frequency signal is an example of an electromagnetic wave.

Within an aircraft, the transmit antenna is located within the interior of the aircraft. This antenna may be located in, for example, the flight deck, a passenger cabin, a galley, or some other suitable location within the aircraft. The receive antenna may take the form of an aircraft communication and/or navigation radio antenna that may be located on the exterior of the aircraft.

These measurements may be part of a process to certify that an aircraft is tolerant of portable electronic devices used onboard the aircraft. One process currently used for certifying aircraft involves moving an antenna within the aircraft and performing measurements around every 50 centimeters from the last measurement point. This process also may include changing the polarization of the antenna, as well as measuring around doors, the flight deck, and the cargo area of the interior. This type of process; however, is time consuming and may require hundreds of hours to perform the tests within guideline procedures. This type of testing is expensive. Therefore, it would be advantageous to have a method and apparatus to overcome the problems described above.

SUMMARY

In one advantageous embodiment, a method is present for accessing aircraft interference path loss in an aircraft. A plurality of radio frequency signals that are stepped through a plurality of frequencies in a frequency range is transmitted from a plurality of locations within an interior of the aircraft. Received radio frequency signals generated at a receive antenna are received in response to transmitting the plurality of radio frequency signals to form a plurality of measurements. An average of averages curve is generated from the plurality of measurements. A peak to average ratio is identified. Field uniformity is identified. A standard error for the average of averages curve is determined. An upper bound for the aircraft interference path loss in the aircraft is predicted using the average of averages curve, the peak to average ration, the field uniformity, and the standard error.

In another advantageous embodiment, a method is present for identifying attenuation within a structure. A plurality of electromagnetic signals that are stepped through a plurality of frequencies in a frequency range is transmitted from a plurality of locations within the structure. Electromagnetic signals received at a receiver are received in response to transmitting the plurality of electromagnetic signals to form a plurality of measurements. A statistical analysis is performed using the plurality of measurements to form a result. A set of attenuations is predicted for the structure using the result.

In yet another advantageous embodiment, an apparatus comprises a set of receive antennas, a set of transmit antennas, and a radio frequency control system. The radio frequency control system is capable of transmitting a plurality of radio frequency signals that are stepped through a plurality of frequencies in a frequency range the set of transmit antennas from a plurality of locations within an interior of an aircraft; measuring received electromagnetic signals generated at the set of receive antennas in response to transmitting the radio frequency signals to form a plurality of measurements; generating an average of averages curve from the plurality of measurements; performing a statistical analysis using the plurality of measurements to form a result, wherein the result is used to predict a set of attenuations for radio frequency transmission from the interior of the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
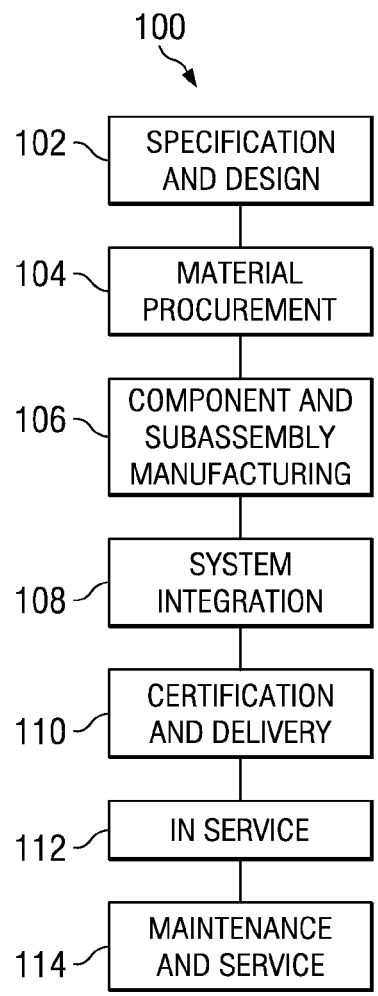
FIG. 1 is a diagram illustrating an aircraft manufacturing and service method in which an advantageous embodiment may be implemented.
Figure 2:
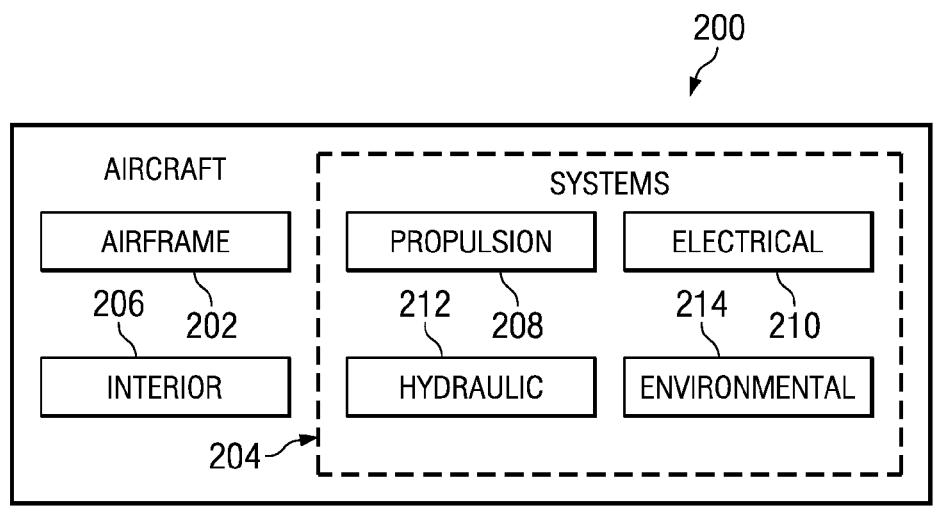
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 take place.

Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. In these examples, the different advantageous embodiments may be implemented during certification and delivery 110 in FIG. 1. In particular, advantageous embodiments may be used during certification and delivery to certify that the use of devices, such as portable electronic devices carried on-board by passengers or crew, within an interior 206 will not interfere with communications for aircraft 200.

Of course, the advantageous embodiments may be implemented during other stages, such as, for example, maintenance and services 114 in FIG. 1. Different advantageous embodiments may be employed during this stage after upgrades or changes in the configuration of interior 206 to determine whether the use of passenger devices will interfere with communications to aircraft 200. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200.

Similarly, one or more of apparatus embodiments, method embodiments, or a combination thereof may be utilized while aircraft 200 is in service 112 or during maintenance and service 114 in FIG. 1. For example, identification of attenuation of radio frequency signals may be performed using different advantageous embodiments if changes in the configuration and/or materials in interior 206 are made.

The different advantageous embodiments recognize that the current methods for measuring interference path loss are time consuming and expensive. The different advantageous embodiments also recognize that existing methods require large numbers of data points to find the worst case coupling path. These methods require large amounts of time and are costly. Further, the different advantageous embodiments recognize that the equipment set up for these types of tests are more complicated in that more test equipment is required. For example, the different advantageous embodiments recognize that the current testing methods require making measurements in 50 cm increments in two polarizations throughout the interior of aircraft 200, as well as measuring the passenger and cargo doors.

Interference path loss is also referred to as attenuation, in these examples. The different advantageous embodiments recognize that the current methods for measuring attenuation do not address the uncertainty of the system in which measurements are made.

The current methods attempt to identify a worst case of attenuation in the transmission of radio frequency signals by taking a large number of samples. The different advantageous embodiments recognize that current methods rely on direct illumination of apertures and attempt to capture the peak or strongest coupling paths through field mapping.

The different advantageous embodiments recognize that the existing methods do not have the capability to determine the uncertainty of measured values. Further, the different advantageous embodiments recognize that the currently used methods do not have a way to identify the likelihood that the worst case coupling path has been measured. A worst case coupling path is one in which the attenuation is the lowest value as compared to other measurements.

One possible solution to the inaccuracies associated with currently used methods is to employ mechanical stirring to change the mode of fields within the zone and/or area being tested. Mechanical stirring may involve rotating or changing the orientation of an electronically conductive paddle. The field is measured at each angular position of the paddle, and an average field strength may be identified by averaging the overall measured values obtained through one complete revolution of the paddle.

The different advantageous embodiments recognize that a mechanical stirring process may increase the accuracy of measurements made within the interior of an aircraft as compared to currently used methods. The different advantageous embodiments, however, also recognize that by using mechanical stirring as opposed to, or in conjunction with, currently used methods, the amount of time needed to perform tests to identify attenuation and signals will not be reduced and may actually be increased. Further, the accuracy may be limited by how well the paddle is designed and used to stir the aircraft interior fields. Additionally, the use of mechanical stirring increases the level of complexity to the test setup. For example, the paddle used in mechanical stirring requires that the rotation be synchronized with the measurement equipment and any other paddles that may be used.

Thus, the different advantageous embodiments provide a method and apparatus to measure the attenuation or interference path loss associated with an aircraft. The different advantageous embodiments provide a method and apparatus to identify attenuation between transmitting and receiving antennas associated with a structure. In the different advantageous embodiments, electromagnetic signals that are stepped through frequencies in a frequency range are transmitted from locations within the structure.

Electromagnetic signals received at a receiver are measured in response to transmitting the electromagnetic signals to form a set of measurements. A statistical analysis may be performed using the set of measurements to form a result. A set of attenuations may be predicted for the structure using the result. The attenuations, in these examples, take the form of attenuation or path loss. Each attenuation identifies an attenuation in a path from a location from which an electromagnetic signal was transmitted to the receiver. In these examples, the electromagnetic signal takes the form of a radio frequency signal.

The different advantageous embodiments employ discrete frequency stirring to reduce the time needed to make measurements. The discrete frequency stirring is facilitated by stepping or changing the frequency of the transmission from a location in small intervals. Frequency step sizes in the range of a couple hundred kilohertz to a couple megahertz are typical for aircraft interiors. This small change in the frequency changes the field structure within a given aircraft interior zone, often by changing the resonant modes associated with that zone. Electromagnetic waves may propagate in different modes, such as a transverse electric mode and a transverse magnetic mode. This propagation may change when the frequency changes.

Further, the use of frequency stirring also reduces the complexity of setting up equipment to measure attenuation. Additionally, the different advantageous embodiments reduce the number of locations at which measurements may be made through statistical analysis. The use of statistical analysis may provide more accurate results or a better ability to identify the lowest attenuation in an aircraft.

Figure 3:
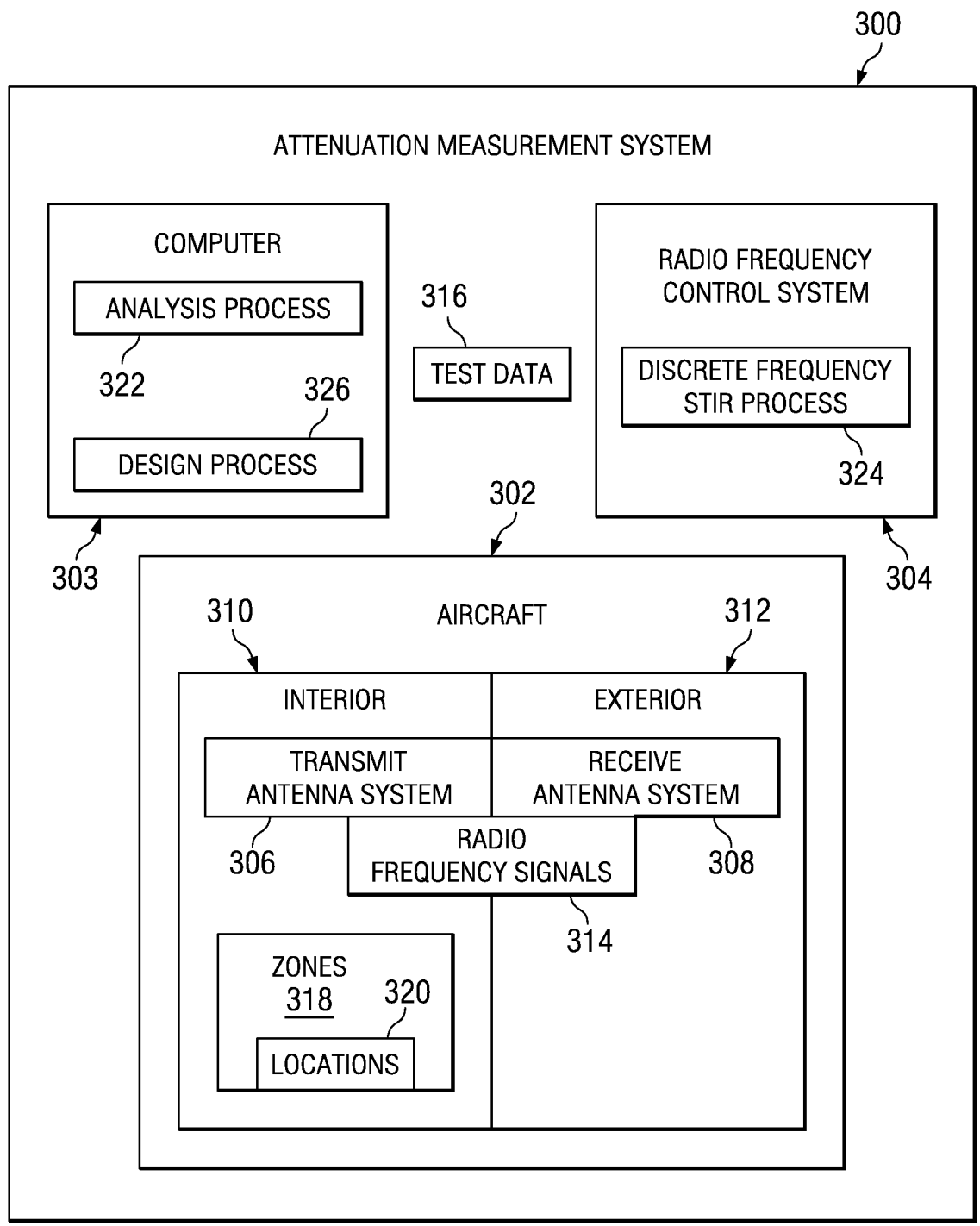
FIG. 3 is an attenuation measurement system in accordance with an advantageous embodiment.

With reference now to FIG. 3, an attenuation measurement system is depicted in accordance with an advantageous embodiment. In this example, attenuation measurement system 300 is an example of an apparatus that may be used to measure attenuation of radio frequency signals in an aircraft, such as aircraft 302. In this example, attenuation measurement system 300 includes computer 303, radio frequency control system 304, transmit antenna system 306, and receive antenna system 308.

Transmit antenna system 306 may include a set of antennas. A set, as used herein, refers to one or more items. For example, a set of antennas is one or more antennas. Receive antenna system 308 also may be a set of antennas. Transmit antenna system 306 may be placed within interior 310 of aircraft 302. Receive antenna system 308 is typically located on exterior 312 of aircraft 302. Receive antenna system 308 may be the antennas used to receive and send communications to and from aircraft 302. Transmit antenna system 306 is test equipment that may be placed into interior 310 for performing attenuation measurement tasks.

In these examples, radio frequency control system 304 is connected to transmit antenna system 306 and receive antenna system 308. Radio frequency control system 304 may be any device that is capable of generating radio frequency signals and receiving radio frequency signals. Further, radio frequency control system 304 also may correlate transmitted signals with received signals, as well as generate or calculate ratios of the signals to each other.

Radio frequency control system 304 may cause transmit antenna system 306 to transmit radio frequency signals 314 within interior 310. Radio frequency signals 314 may travel through aircraft 302 to exterior 312 to be received by receive antenna system 308. Radio frequency control system 304 measures the strength of radio frequency signals 314 received by receive antenna system 308 and stores this information as test data 316. Test data 316 also may include the strength of radio frequency signals 314 as transmitted by transmit antenna system 306.

This testing may be performed in zones 318 within interior 310 of aircraft 302. Zones 318 may be selected based on various factors. For example, zones 318 may be selected based on partitions within interior 310 that may be opaque to radio frequency signals 314. Further, zones 318 also may be selected or identified based on different levels within aircraft 302. Transmit antenna system 306 may be placed or moved to locations 320 in zones 318. Transmissions and measurements may be made at each location 320 within zones 318.

In the different advantageous embodiments, attenuation measurement system 300 does not attempt to measure the worst case, or smallest amount, of attenuation correctly through large numbers of measurements as made by currently used methods. Instead, measurements are made in a smaller number of locations and a statistical analysis may be performed on test data 316 by analysis process 322 executing in computer 303 to identify a worst case attenuation that may be experienced by a radio frequency signal within aircraft 302. In particular, the different advantageous embodiments may use this statistical analysis to identify a zone within interior 310 in which a lowest amount of attenuation may occur for a particular receive antenna.

The different advantageous embodiments employ discrete frequency stir processes to obtain better data that may be used for statistical analysis as compared to currently used methods. In these examples, discrete frequency stir process 324 may be executed by radio frequency control system 304 to transmit radio frequency signals 314 in a step fashioned across a frequency range.

In other words, discrete frequency stir process 324 utilizes a stepped frequency measurement approach to excite and monitor radio frequency signals within zone 318 that can be characterized statistically. At each location 320 within zones 318, radio frequency signals 314 are transmitted from transmit antenna system 306. This transmission involves transmitting a radio frequency signal using a first frequency.

Discrete frequency stir process 324 then steps or changes the frequency by a selected step or value to another frequency. A radio frequency signal is then transmitted at the new frequency. Discrete frequency stir process 324 continues to change or step the frequency until the entire frequency range of interest has been processed. The frequency range of interest is chosen to cover the operation frequency range of the receive system under test, at a minimum. The frequency range of interest may be extended beyond the operational frequency range of the receive system under test to provide a more thorough statistical assessment. The stirring bandwidth is the portion of the frequency range to which statistical analysis is applied.

This stepping or changing of the value may be in increment or decrement of the frequency depending on the implementation. The frequency step size is generally held constant over a frequency range of interest, but may be changed in going from one frequency range of interest, pertinent to a given receive system, to another frequency range of interest for a different receive system. In these examples, the frequency step size is determined by statistical analysis to produce statistically independent samples. The step size may vary between different zones.

In these examples, the step used to change the value of the frequency may be selected to be larger than the resonant mode bandwidth associated with the particular zone within zones 318. This selection of the step size may provide statistically independent measurements when radio frequency signals 314 are received by receive antenna system 308, and measurements of the signal strengths are made by radio frequency control system 304.

In these examples, the resonant mode bandwidth is the bandwidth of individual resonant modes associated with a particular zone within interior 310. The resonant mode bandwidth may be based on a quality factor of the cavity and may be used to determine the frequency step size. The quality factor of the zone may be identified from a previous measurement. Alternatively, the quality factor may be analytically estimated according to standard formulations based on physical size and electrical properties.

As an example, high quality factor enclosures for cavities, such as reverberation chambers, may have resident mode bandwidths in a range of around 10 KHz to around 1 MHz across a frequency range of around 100 MHz to 18 GHz. Moderate quality factor cavities, such as interior 310 of aircraft 302, may have resident mode bandwidth in a range of around 200 KHz to around 10 MHz for the same frequency range.

In these examples, the range of frequencies for which the radio frequency field within zone 318 can be characterized statistically is referred to as the stirring bandwidth. The stirring bandwidth is typically a small portion of the entire frequency range used in the test. In these examples, the stirring bandwidth may be selected to be small enough such that the average field value within interior 310 is considered to be consistent across the range of frequencies.

In one advantageous implementation, the stirring bandwidth may be chosen to be large enough to contain a statistically significant number of samples. These samples may be used for the performance of statistical analysis, such as an assessment of field distributions. The stirring bandwidth may be selected to be small enough to maintain a desired frequency resolution in the average field values.

In an illustrative example, a stirring bandwidth with one hundred steps per measurement may be employed. This number of steps within a range of frequencies may be adequate for statistical analysis purposes. The selection of these parameters, as well as other test parameters and procedures, may be implemented using design process 326 in computer 303.

The illustration of attenuation measurement system 300 in FIG. 3 is provided for purposes of illustrating one manner in which different advantageous embodiments may be implemented. For example, in some advantageous embodiments, a portion of receive antenna system 308 also may be located in interior 310. In other advantageous embodiments, attenuation measurement system 300 may be applied to other structures having interiors or cavities. For example, attenuation measurement system 300 may be applied to test attenuation of transmissions from within an interior of a building, a submarine, a spacecraft, a ship, a tank, or some other suitable structure.

In obtaining test data, field uniformity may be monitored. Field uniformity is important to measurement uncertainty in the analysis. Field uniformity may be driven by the number of independent resonant modes excited within the stirring bandwidth, $BW_{stir}$. For a given zone within an aircraft, the total number of modes within the stirring bandwidth may be identified from Weyl's approximation as follows:

$$N = \frac{8\pi V}{c^3} f^2 BW_{stir}$$

where N is the number of modes, $BW_{stir}$ is the stirring bandwidth, f is the frequency, c is the speed of light, and V is volume of the cavity or interior.

In practice the number of independent resonant modes within the stirring bandwidth may be limited by mode overlap. Mode overlap may be caused by the non-zero resonant mode bandwidth which may be identified as follows:

$$BW_Q = \frac{f}{Q}$$

where $BW_Q$ is the none-zero resident mode band width, f is the frequency, and Q is the quality factor associated with a given aircraft interior zone. To account for the non-zero resonant mode bandwidth, the number of independent resonant modes within the stirring bandwidth may be limited as follows:

$$N_{ind} \leq \frac{BW_{stir}}{BW_Q}$$

where $N_{ind}$ is the number of independent resonant modes.

Further, in processing this data, sample independence may affect field uniformity. Sample independence is needed for statistical analysis of data sets in these depicted examples. This independence may be identified as follows using Pearson's r auto correlation check:

$$r = \frac{\sum_i (x_i - \bar{x})(y_i - \bar{y})}{\sqrt{\sum_i (x_i - \bar{x})^2} \sqrt{\sum_i (y_i - \bar{y})^2}}$$

where the x's represent a data set, and the y's represent the same data set shifted by 1. As a result, x2 becomes y1 and x3 becomes y2 as an example. In this example, the result is uncorrelated when r is less than 1/e. In this example, e refers to a mathematical constant with a value of around 2.718. This constant is also referred to as Euler's number.

A value of r=0 indicates that the data is completely uncorrelated. Correlated data may suggest that the resonant mode bandwidth was not correctly estimated and the frequency step size may have been too small. As a result, the process may be re-performed using a larger step size. A larger frequency step size may be identified based on an improved estimate of the resident mode bandwidth. Alternatively, the correlated data set may be sifted to obtain an uncorrelated data set. In these different advantageous embodiments, statistical analysis of test data 316 may be performed to examine the distribution in measured fields and to compare those measured distributions with theoretical distributions.

Figure 4:
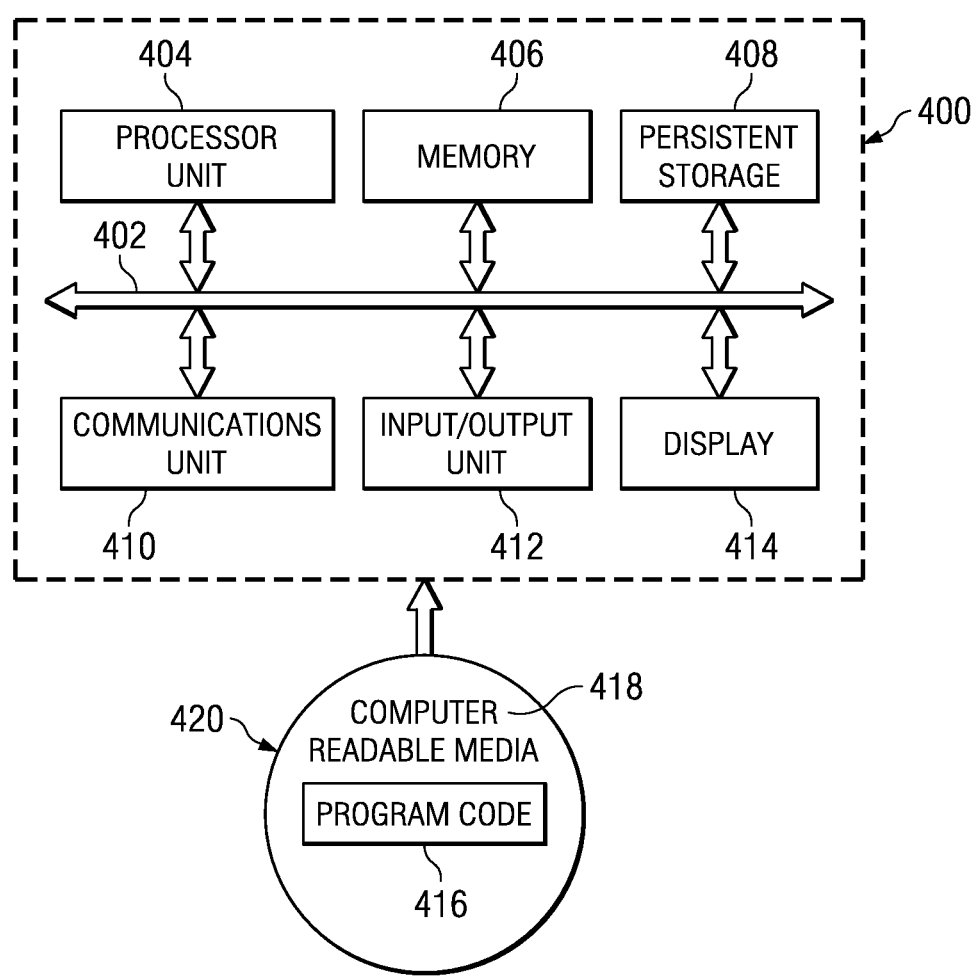
FIG. 4 is a diagram of a data processing system in accordance with an illustrative embodiment.

Turning now to FIG. 4, a diagram of a data processing system is depicted in accordance with an illustrative embodiment. Data processing system 400 is an example of a data processing system that may be used to implement computer 303 in FIG. 3. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

Figure 5:
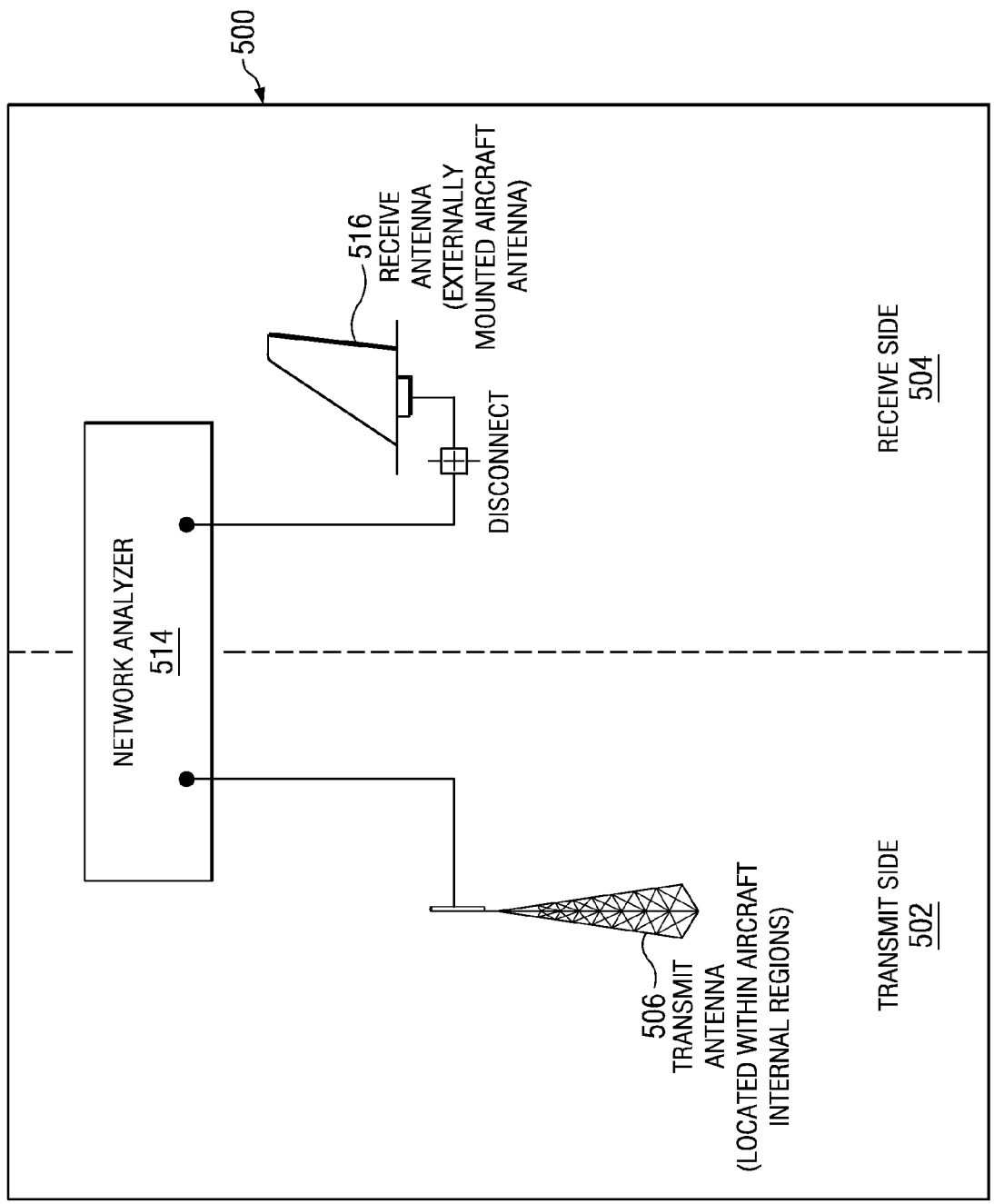
FIG. 5 is a diagram illustrating a discrete frequency stir system in accordance with an advantageous embodiment.

With reference now to FIG. 5, a diagram illustrating a discrete frequency stir system is depicted in accordance with an advantageous embodiment. Discrete frequency stir system 500 is an example of one implementation for a portion of attenuation measurement system 300 in FIG. 3. Discrete frequency stir system 500 includes transmit side 502 and receive side 504. Transmit side 502 generates radio frequency signals within the interior of the aircraft, while receive side 504 receives these signals. In this example, transmit side 502 includes transmit antenna 506. Receive side 504 includes receive antenna 516.

These components are connected to network analyzer 514. Network analyzer 514 is an example of a component that may be used to implement radio frequency control system 304 in FIG. 3. In this example, transmit antenna 506 is an example of an antenna that may be within transmit antenna system 306 in FIG. 3 and may generate radio frequency signals at the desired frequencies. In these examples, the frequencies may range from around 200 MHz to around 20 GHz.

Transmit antenna 506 is connected to network analyzer 514. Network analyzer 514 generates the signals transmitted by transmit antenna 506. Depending on the implementation, transmit antenna 506 may be connected directly to network analyzer 514.

In these examples, network analyzer 514 is an instrument used to analyze properties of electrical networks. These properties include, in these examples, the transmission of electrical signals. Network analyzers are typically used at high frequencies, which may range from around 9 kilohertz to around 110 GHz. In this example, network analyzer 514 may be implemented using a precision network analyzer available from Agilent Technologies, Inc. An EA 364B PNA network analyzer is an example of a precision network analyzer that is available from Agilent Technologies, Inc. This network analyzer may provide frequencies from around 10 MHz to around 50 GHz.

Radio frequency signals transmitted by transmit antenna 506 may be received by receive antenna 516. Receive antenna 516 is an example of an antenna within receive antenna system 308 in FIG. 3. In these examples, receive antenna 516 may be, for example, an externally mounted aircraft antenna.

Network analyzer 514 may generate radio frequency signals in the form of a low level step frequency continuous wave transmit signal. This frequency may be stepped through different frequencies in a manner to perturb or stir the electromagnetic field within the interior of the aircraft. In these examples, the radio frequency signals are a short duration, continuous wave radio frequency signal that is stepped at selected frequencies across a frequency range of interest.

The discrete frequency stirring generates different modes to provide data needed for analysis. Measurements within a small range of frequencies may be equivalent to moving transmit antenna 506 to various locations within the zone of interest and measuring the strength of the signals for a single frequency at those locations.

With discrete frequency stirring, the average strength of a signal may be identified by averaging over discrete frequency measurements that fall within the portion of the frequency range being measured. The portion of the frequencies used to identify the average strength for any given center frequency may be identified as the stirring bandwidth as described above. This stirring bandwidth may be changed across the frequency range being measured as needed to accommodate for frequency dependent effects of the enclosure. For example, the resonant mode bandwidth of the enclosure may change with frequency requiring adjustment of the stirring bandwidth to maintain an adequate number of samples within the stirring bandwidth.

These signals transmitted by transmit antenna 506 may be received by receive antenna 516. The data gathered by network analyzer 514 may then be analyzed to identify attenuation that occurs at different locations within the interior of the aircraft.

Network analyzer 514 may make measurements based on a ratio of the transmitted and received signal levels. In other words, a ratio of the strength of a radio frequency signal transmitted through transmit antenna 506 is compared to the strength of the radio frequency signal received by receive antenna 516. This measurement may be referred to as the attenuation or gain of the radio frequency signal. The test data gathered by network analyzer 514 may then be analyzed to identify attenuation that occurs at different locations within the interior of the aircraft. This attenuation is the attenuation that occurs in a path from transmit antenna 506 to receive antenna 516.

In these examples, a statistical analysis is used to reduce the number of measurements needed to obtain desired results. In these examples, an identification of a least amount of attenuation or worst case interference path loss is identified. These types of measurements may be made for different regions within an aircraft. Illustration of discrete frequency stir system 500 is presented as one possible implementation for an advantageous embodiment. This illustration is not meant to limit the manner in which other advantageous embodiments may be configured or constructed. Of course, other components may be used in addition to or in place of the ones illustrated in these examples.

The illustration of discrete frequency stir system 500 in FIG. 5 is presented for purposes of illustrating one manner in which this system may be implemented. This illustration is not meant to imply physical or architectural limitations to the manner in which such a system may be implemented. These components may include, for example, amplifiers and couplers. These types of components may be implemented and used to overcome degradation in the measurement system dynamic range that may occur due to losses in coaxial cables or other wires used to connect analyzer 514 to transmit antenna 506 and/or receive antenna 516.

Figure 6:
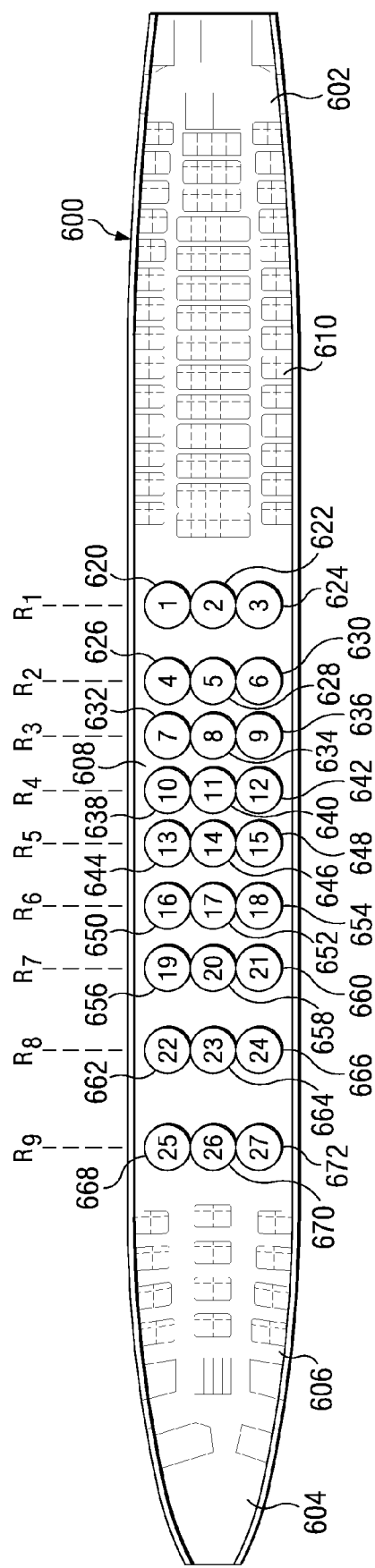
FIG. 6 is a diagram of an interior of an aircraft in accordance with an advantageous embodiment.

With reference now to FIG. 6, a diagram of an interior of an aircraft is depicted in accordance with an advantageous embodiment. In this example, aircraft 600 is an example of one implementation of aircraft 200 in FIG. 2. Interior 602 is an example implementation of interior 310 in FIG. 3.

In this example, interior 602 includes zones 604, 606, 608, and 610. In these illustrative examples, these zones may be defined or selected based on monuments in the aircraft. These monuments may be, for example, galleys, radio frequency opaque dividers, or other monuments.

Further, a zone may be defined based on different levels in the aircraft, such as between the main cabin, a cargo hold, an upstairs cabin, or some other suitable level. Further, a zone also may be described as any continuous area where the uniformity of radio frequency fields behave as desired.

In these examples, measurements may be made using attenuation measurement system 300 in FIG. 3 at multiple transmission positions, such as positions 620, 622, 624, 626, 628, 630, 632, 634, 636, 638, 640, 642, 644, 646, 648, 650, 652, 654, 656, 658, 660, 662, 664, 666, 668, 670, and 672.

Figure 7:
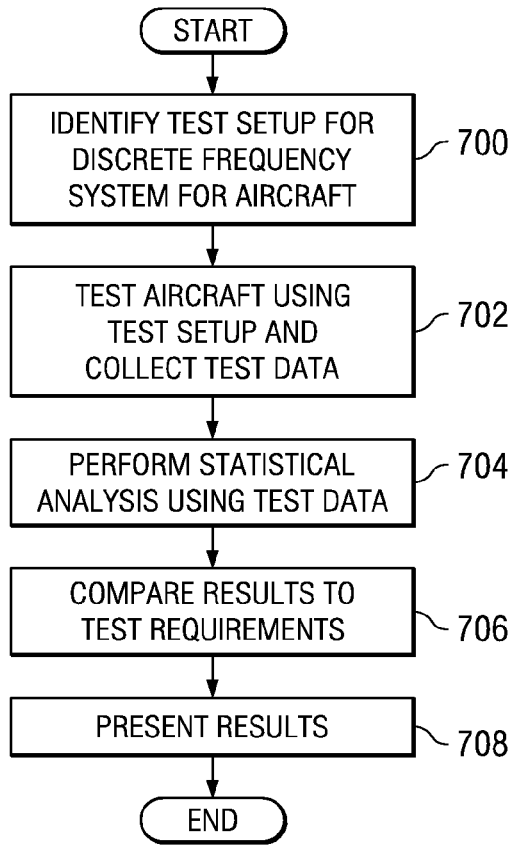
FIG. 7 is a process for assessing attenuation in transmissions in an aircraft in accordance with an advantageous embodiment.

With reference now to FIG. 7, a process for assessing attenuation in transmissions in an aircraft is depicted in accordance with an advantageous embodiment. The process illustrated in FIG. 7 may be implemented using an apparatus, such as attenuation measurement system 300 in FIG. 3.

The process begins by identifying a test setup for a discrete frequency system for an aircraft (operation 700). This test setup may include, for example, an identification of components, as well as locations, test frequencies, and other parameters needed to test the aircraft for attenuation of signals transmitted from a transmit antenna to a receive antenna. The process tests the aircraft using the test setup and collects test data (operation 702). This test data may include, for example, the ratios of signal strengths sent and received during the test.

The process performs statistical analysis using the test data (operation 704). The results of the statistical analysis are compared to test requirements (operation 706), and the results may be presented (operation 708). These results may be presented in a report that may be, for example, on a display or in printed form. The process terminates thereafter.

Figure 8:
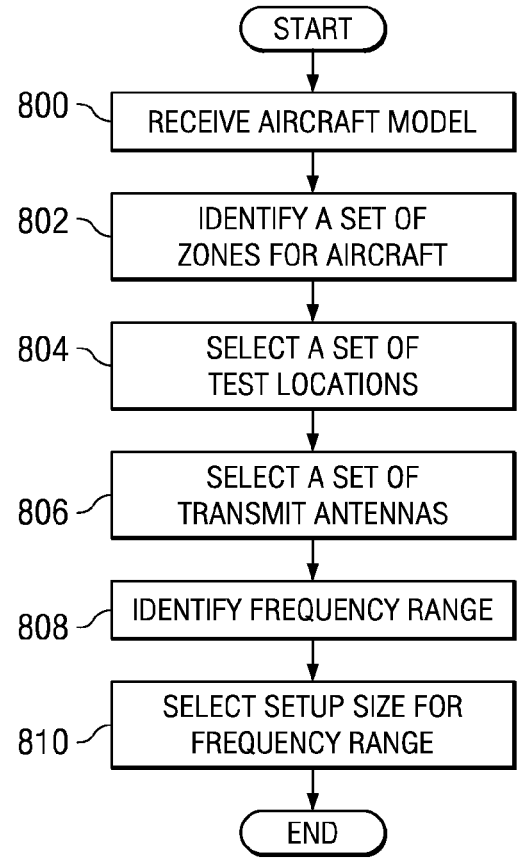
FIG. 8 is a flowchart of a process for identifying a test setup in accordance with an advantageous embodiment.

With reference now to FIG. 8, a flowchart of a process for identifying a test setup is depicted in accordance with an advantageous embodiment. The process illustrated in FIG. 8 is a more detailed illustration of operation 700 in FIG. 7. The process illustrated in FIG. 8 may be implemented using a data processing system, such as computer 303 in FIG. 3.

The process begins by receiving an aircraft model (operation 800). This aircraft model may include information about the interior regions within the aircraft. Further, the aircraft model also may identify the number of antennas that are present on the exterior of the aircraft.

The process identifies a set of zones for the aircraft (operation 802). These zones may be selected based on divisions within the aircraft caused by monuments, such as galleys, radio frequency opaque dividers, or other suitable objects. This operation also may identify zones based on different levels within the aircraft. In other advantageous embodiments, these zones may be identified as any continuous area in which a uniformity of radio frequency fields may be demonstrated.

The process selects a set of test locations for each zone (operation 804). In the different advantageous embodiments, usually three or more test locations per zone may be selected. Of course, the number of test locations may vary depending on the particular embodiment. In some examples, twenty test locations may be selected while in other embodiments, ten or fifteen test locations may be selected. The process selects a set of transmit antennas (operation 806). Although the different examples illustrate the use of one transmit antenna, multiple transmit antennas may be used to increase the speed at which test data may be obtained. Multiple transmit antennas may be used to transmit across different frequency ranges at the same time in these illustrative examples.

The process identifies a frequency range over which the test is to be performed (operation 808). This frequency range includes, but is not limited to, the operational frequency range of the receive system under test. The process then selects a step size for the frequency range (operation 810), with the process terminating thereafter. In operations 808 and 810, the frequency range and step size may vary for different external antennas.

Figure 9:
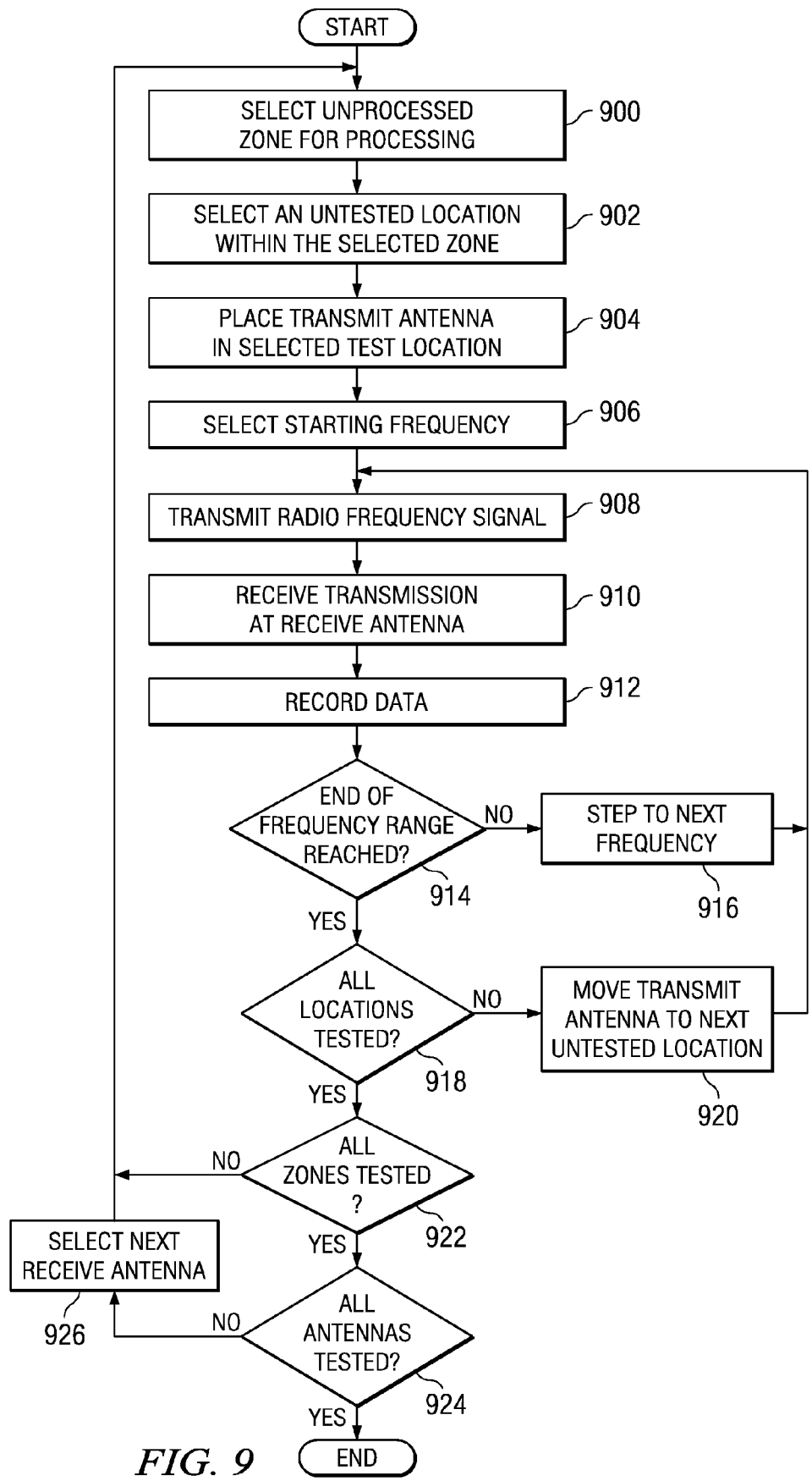
FIG. 9 is a flowchart of a process for measuring attenuation of radio frequency signals in accordance with an advantageous embodiment.

With reference now to FIG. 9, a flowchart of a process for measuring attenuation of radio frequency signals is depicted in accordance with an advantageous embodiment. The process illustrated in FIG. 9 is a more detailed illustration of operation 702 in FIG. 7. This process may be implemented using a frequency stir system, such as discrete frequency stir system 500 in FIG. 5.

The process begins by selecting an unprocessed zone for processing (operation 900). Thereafter, the process selects an untested location within the selected zone (operation 902). A transmit antenna is placed in the selected test location (operation 904). The process selects a starting frequency for the test (operation 906). The process then transmits a radio frequency signal using the selected frequency (operation 908).

Thereafter, the process receives a transmission at the receive antenna in response to the radio frequency signal (operation 910). The process records the data (operation 912). This data may include, for example, a value for the strength of the signal transmitted and a value for the strength of the signal received. Additionally, a ratio of these values also may be calculated and recorded. In these examples, the data may be associated with the different locations and zones within the records that are recorded.

Next, a determination is made as to whether the end of the frequency range has been reached (operation 914). The frequency range in operation 914 is the range of frequencies relevant to the receive system being tested in these illustrative examples. If the end of the frequency range has not been reached, the process steps to the next frequency (operation 916). Thereafter, the process returns to operation 908 as described above.

If the end of frequency range has been reached in operation 914, the process determines whether all the locations within the selected zone have been tested (operation 918). If all of the locations have not been tested, the process moves the transmit antenna to the next untested location (operation 920). The process then returns to operation 908 as described above.

If all of the locations have been tested in operation 918, the process determines whether all the zones have been tested (operation 922). If all of the zones have not been tested, the process returns to operation 900. If all of the zones have been tested, a determination is made as to whether all of the antennas have been tested (operation 924).

If all of the antennas have not been tested, the process selects the next receive antenna for testing (operation 926), with the process returning to operation 900 to process zones for the new antenna. If all of the receive antennas have been tested in operation 924, the process terminates.

Figure 10:
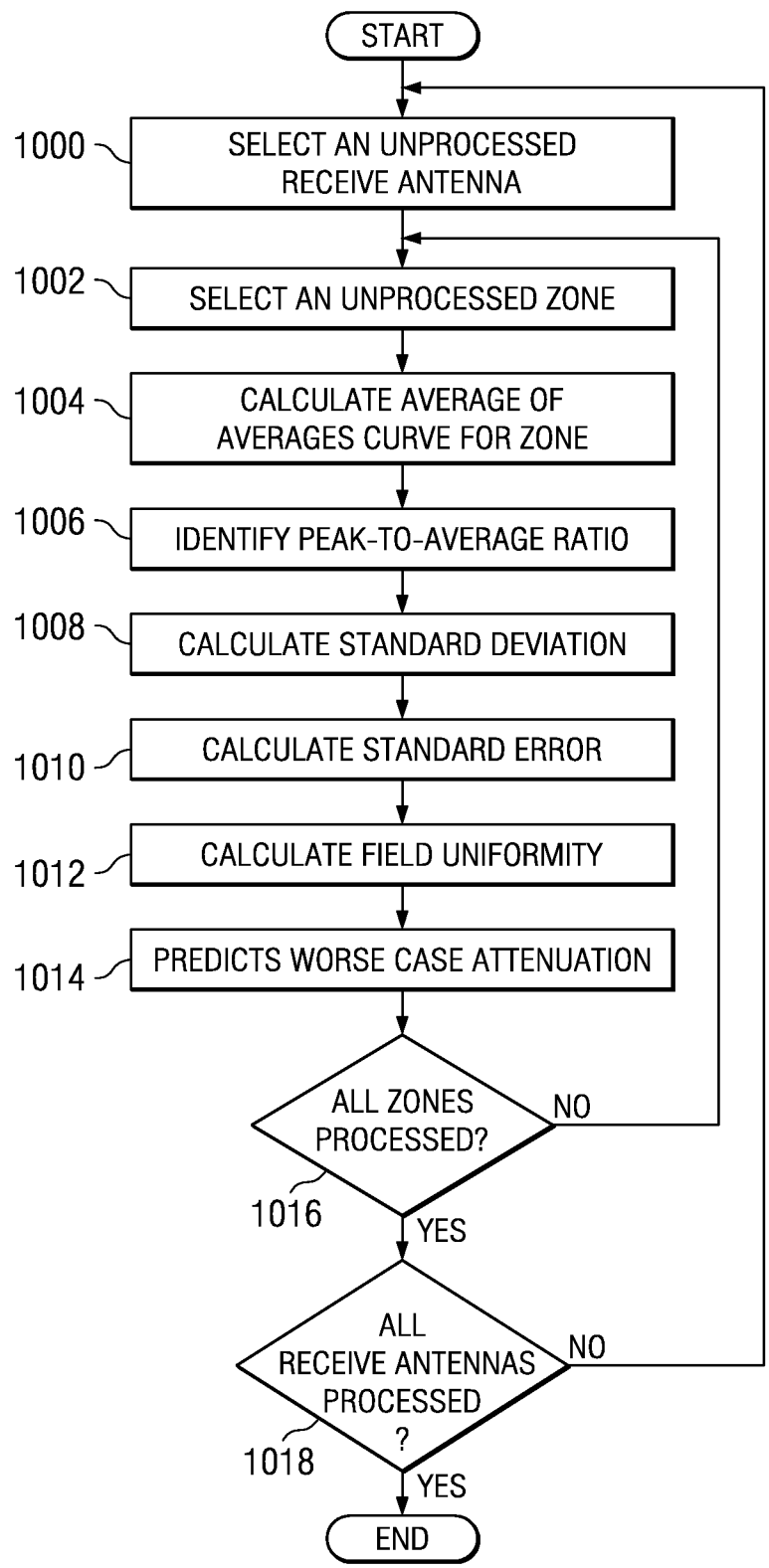
FIG. 10 is a flowchart of a process for identifying a worst case attenuation for each zone within an aircraft in accordance with an advantageous embodiment.

With reference now to FIG. 10, a flowchart of a process for identifying a worst case attenuation in a zone within an aircraft is depicted in accordance with an advantageous embodiment. The process illustrated in FIG. 10 may be performed using a process, such as analysis process 322 in FIG. 3. This component may perform key process using test data obtained in operation 912 in FIG. 9.

The process begins by selecting an unprocessed receive antenna (operation 1000). Thereafter, the process selects an unprocessed zone within the interior of the aircraft (operation 1002). These selections are used to identify data sets for processing.

Thereafter, the process calculates an average of averages curve for the selected zone (operation 1004). The average of averages curve is a curve containing the average per frequency of all relevant discrete frequency stirred attenuation versus frequency data points obtained through the measurement of attenuation in a given zone of the aircraft interior for a given receive antenna. For example, if five test locations are present in a zone, then the five discrete frequency stirred curves, which are also referred to as averaged curves, associated with those five test locations are averaged to obtain an average of averages curve. In other words, a point on an average of averages curves is an average of the five averages for a given frequency.

The process then identifies a peak-to-average ratio (operation 1006). The peak-to-average ratio may be specific to the aircraft zone that is being evaluated. This peak-to-average ratio may be based on the number of independent modes generated by the discrete frequency stir bandwidth. This value also may be based on the distribution of measured data. A measured peak-to-average ratio is the difference between the average of averages curve and the average of peaks curve for a given aircraft zone. In other words, operation 1006 may result in a curve showing the peak-to-average ratio for different frequencies.

Next, in these examples, the process calculates the standard deviation (operation 1008). The standard deviation σ of average field values for each frequency is calculated in this operation. This operation involves the standard deviation of the various discrete frequency stir produced attenuation versus frequency curves in comparison to the average of averages curve.

The process calculates the standard error for the average of averages curve (operation 1010). This calculation may be calculated in accordance with statistical analysis norms. Through this calculation, the uncertainty of the interference path loss or attenuation may improve as the number of measurements per zone increase.

The process uses this calculation to calculate the field uniformity (operation 1012). In these examples, the field uniformity may be calculated as Aσ, where A is the coefficient set by a user to realize a desired confidence level for the test. A common value for A is around 2.5, representing 99 percent confidence level. In this example, σ is the standard deviation calculated in operation 1008.

The process predicts the worst case attenuation (operation 1014). This worst case attenuation may also be referred to as the worst case interference path loss or interference path loss upper bound. This attenuation may be calculated as follows:

$$IPL_{UB} = AOA + PAR + U_{field} + A\sigma$$

$IPL_{UB}$ is the upper bound or worst case attenuation, AOA is the average of averages, PAR is the peak-to-average ratio, $U_{field}$ is the field uniformity (Aσ), and $Err_{STD}$ is the standard error.

Of course, more than one attenuation path may be identified or predicted depending on the implementation. In some cases, it may be desirable to also know where the most attenuation occurs. In yet other advantageous embodiments, a set of attenuations identifying location at which attenuations fall below or above a threshold value may be desired.

The process then determines whether data for all the zones has been processed (operation 1016). If all of the zones have not been processed, the process returns to operation 1002 to select another unprocessed zone. If all the zones have been processed, a determination is made as to whether data for all the zones for all the receive antennas has been processed (operation 1018). If all of the receive antennas have not been processed, the process returns to operation 1000, otherwise the process terminates.

Figure 11:
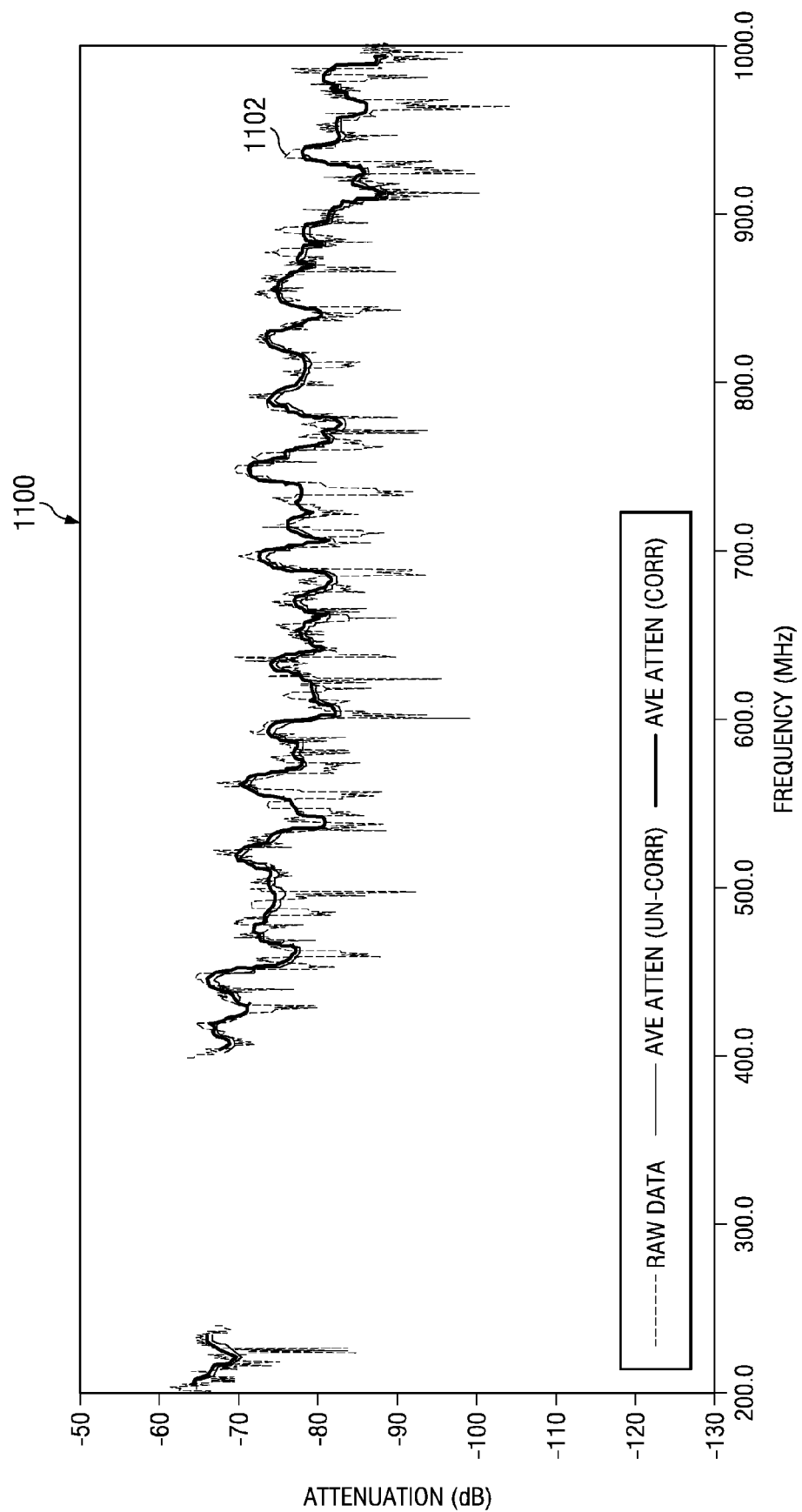
FIG. 11 is measured attenuation data from a location in an aircraft in accordance with an advantageous embodiment.

With reference now to FIG. 11, measured attenuation data from a location in an aircraft is depicted in accordance with an advantageous embodiment. Graph 1100 illustrates data generated from measuring attenuations from a location in an aircraft, such as aircraft 600 in FIG. 6.

The y-axis represents attenuation, while the x-axis represents frequency in this example. The data in graph 1100 represents attenuation for low band discrete frequency measurements within the aircraft. Line 1102 illustrates discrete frequency averaged attenuation for the different frequencies for the location. Line 1102 illustrates an average attenuation for the different frequencies in this location.

Figure 12:
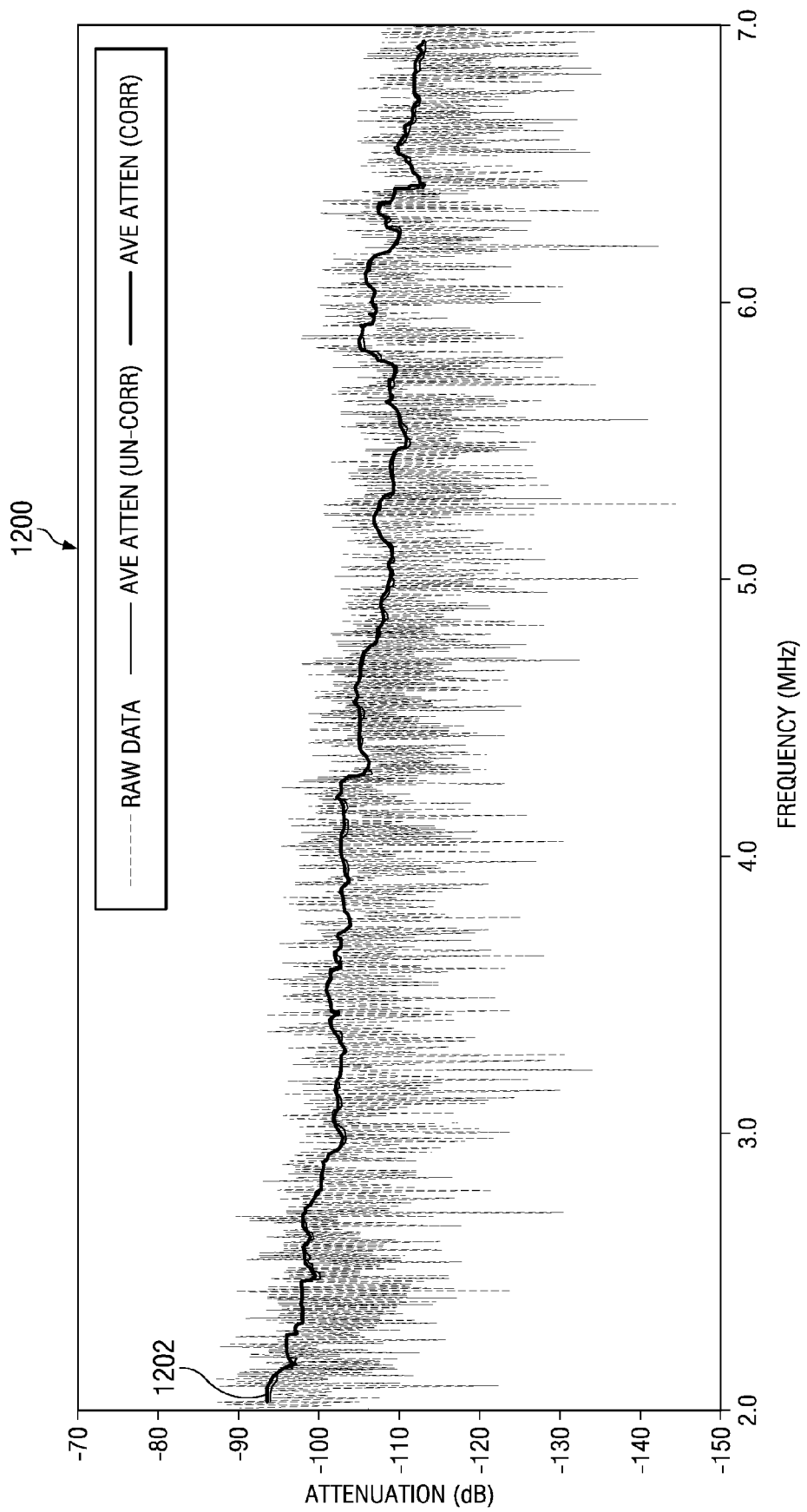
FIG. 12 is a diagram illustrating attenuation data measured from within an aircraft in accordance with an advantageous embodiment.

With reference now to FIG. 12, a diagram illustrating attenuation data measured from within an aircraft is depicted in accordance with an advantageous embodiment. The y-axis represents attenuation, while the x-axis represents frequency in this example. In this example, graph 1200 illustrates attenuation measurements made using high band discrete frequency measurements in an aircraft, such as aircraft 600 in FIG. 6.

Line 1202 illustrates discreet frequency averaged attenuation for the different frequencies in this location. In these examples, lines 1100 and 1200 represent raw data, while 1102 and 1202 are the discreet frequency average data that represents the raw data averaged over the stirring bandwidth.

Figure 13:
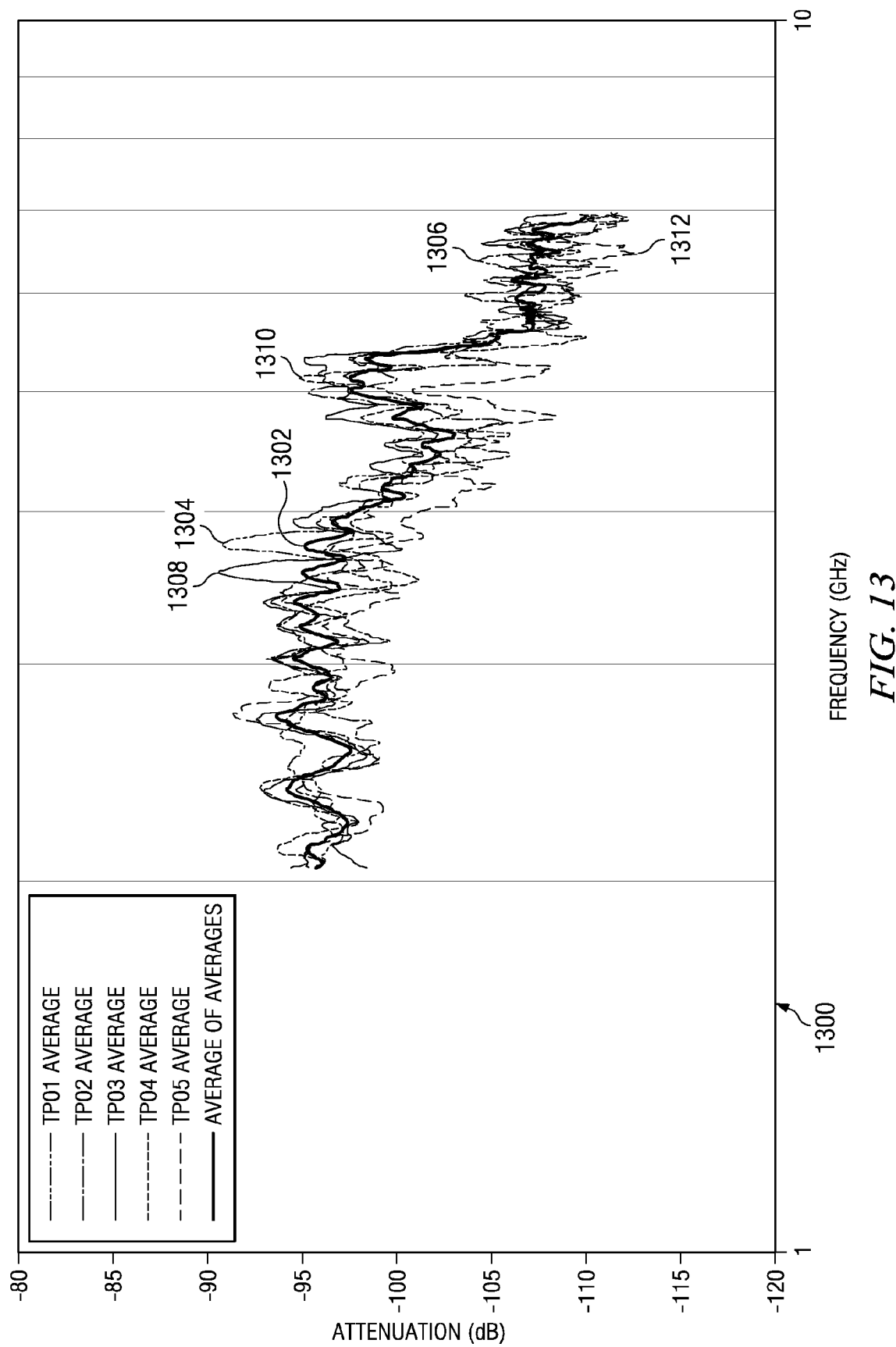
FIG. 13 is a diagram illustrating an average of averages curve in accordance with an advantageous embodiment.

With reference now to FIG. 13, a diagram illustrating an average of averages curve is depicted in accordance with an advantageous embodiment. In this example, graph 1300 illustrates an average of averages curves in line 1302. Line 1302 is generated from lines 1304, 1306, 1308, 1310, and 1312 in these examples. This average of averages curve in line 1302 may be generated in operation 1004 in FIG. 10.

Figure 14:
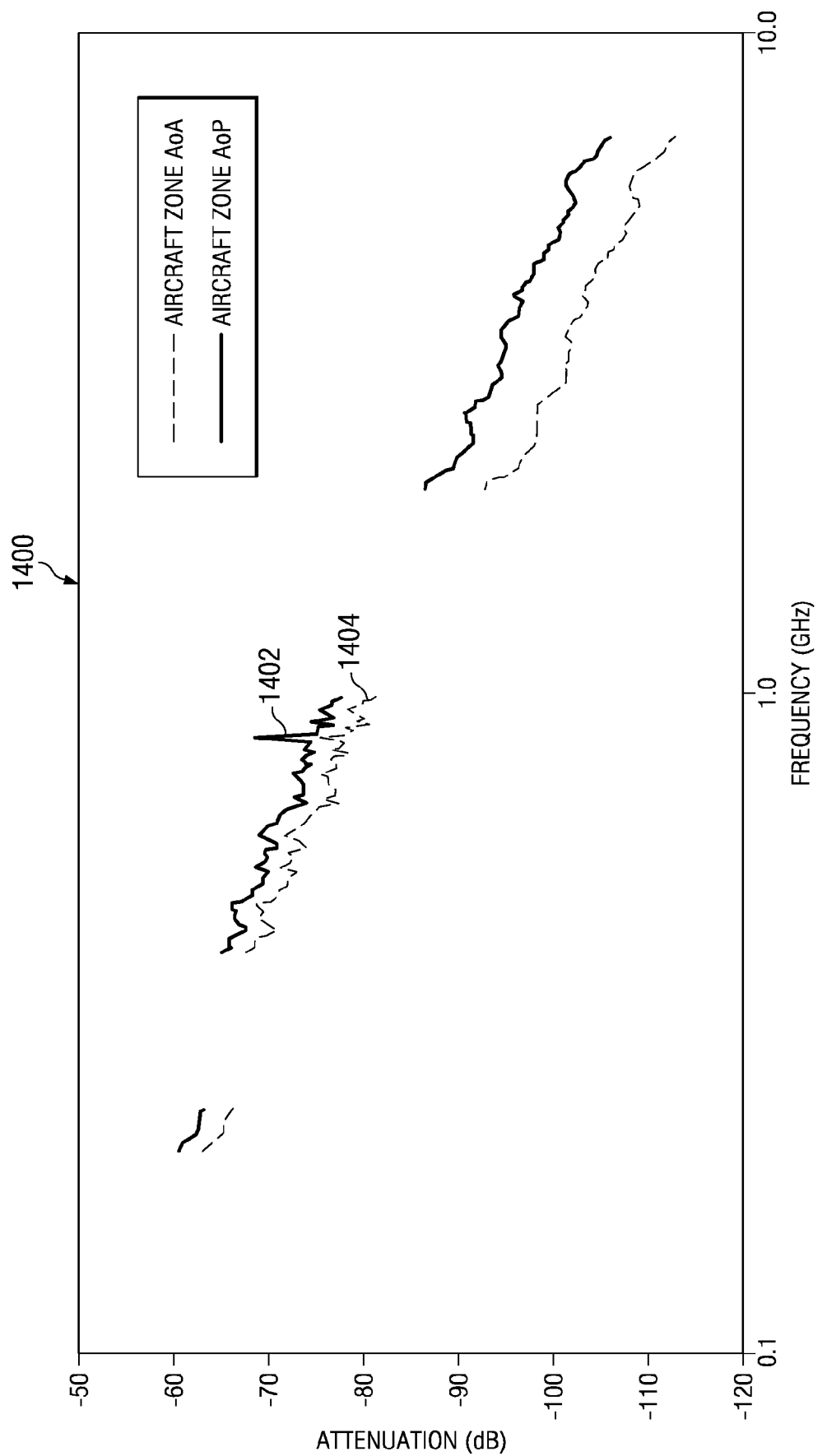
FIG. 14 is a diagram illustrating a peak to average ratio in accordance with an advantageous embodiment.

With reference now to FIG. 14, a diagram illustrating a peak to average ratio is depicted in accordance with an advantageous embodiment. In graph 1400, a measurement of peak to average ratio is illustrated. Attenuation is shown on the y-axis, while the frequency is shown on the x-axis in graph 1400.

Line 1402 represents the average of peaks in the data, while line 1404 represents the average of averages curve for a particular zone. Curve 1402 is the average of the peak attenuation values measured at each measurement location within a zone for a given frequency.

The average to peak ratio may be identified as the difference between lines 1402 and 1404. This peak to average ratio is identified in operation 1006 in FIG. 10.

Figure 15:
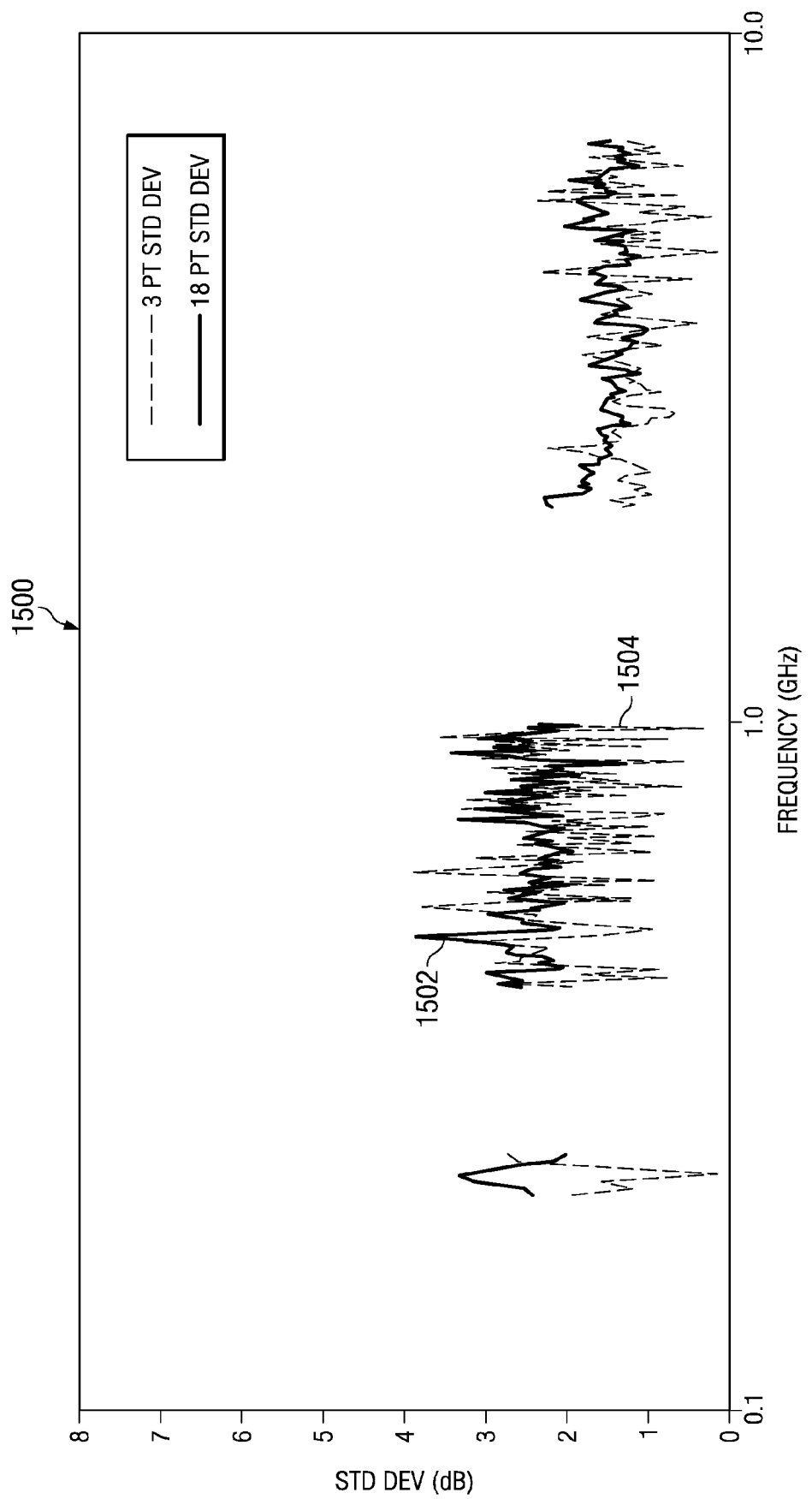
FIG. 15 is a diagram illustrating standard deviations in accordance with an advantageous embodiment.

With reference now to FIG. 15, a diagram illustrating standard deviations is depicted in accordance with an advantageous embodiment. Graph 1500 may be generated using operation 1008 in FIG. 10. Graph 1500 gives an example of standard deviations that may occur in making measurements.

The standard deviations are shown on the y-axis, while the frequency is shown on the x-axis in graph 1500. Line 1502 illustrates the standard deviations for different frequencies when 3 points or locations are measured. Line 1504 illustrates the standard deviation when 18 locations are measured. In these examples, the standard deviation may be multiplied by 2.5 to identify the field uniformity with around a 99 percent confidence level.

Figure 16:
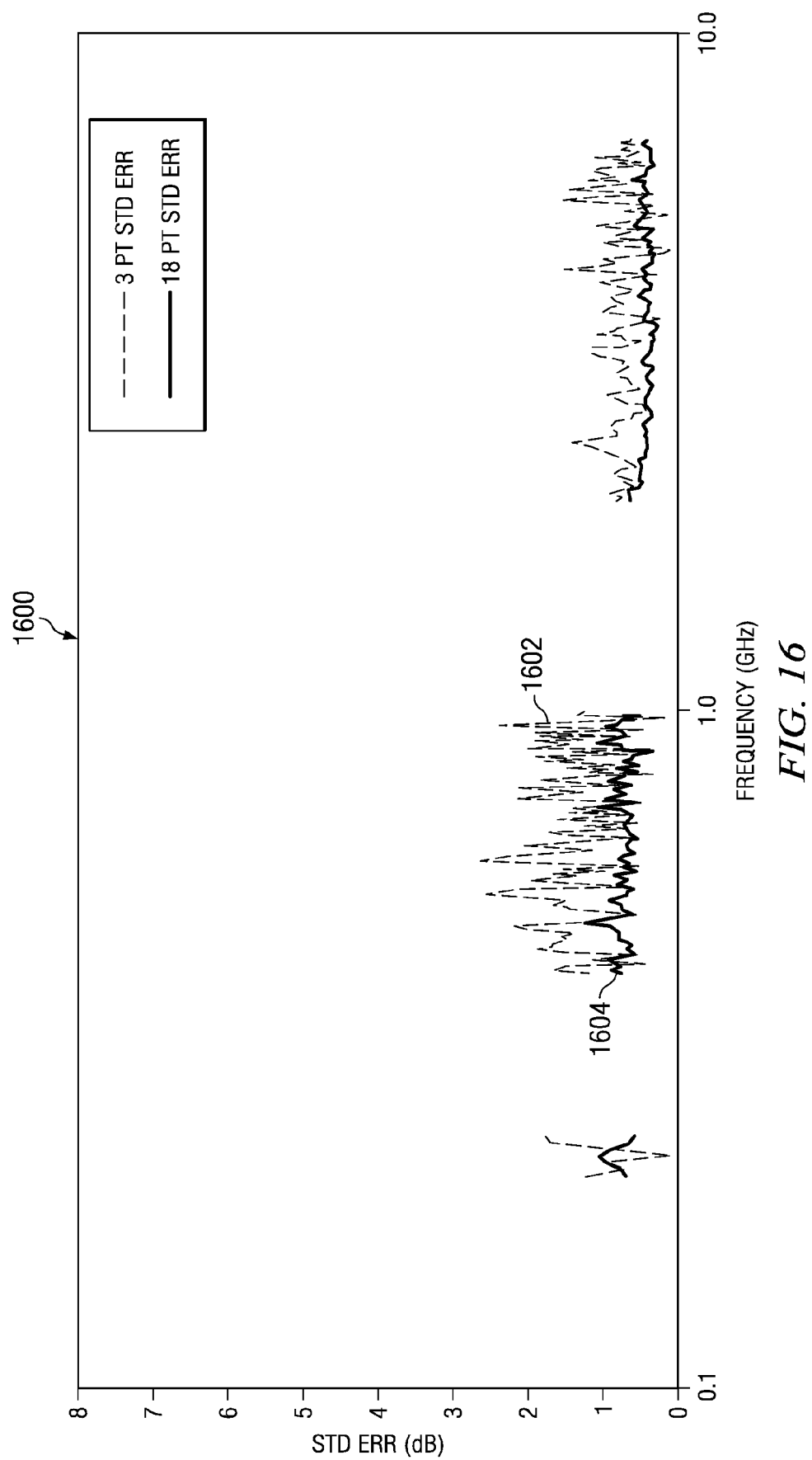
FIG. 16 is a diagram illustrating standard error for an average of averages curve in accordance with an advantageous embodiment.

With reference now to FIG. 16, a diagram illustrating standard error for an average of averages curve is depicted in accordance with an advantageous embodiment. In this example, graph 1600 illustrates the standard error as a function of frequency. Line 1602 illustrates the standard error when measurements are taken at 3 locations, while line 1604 indicates the standard error when measurements are taken at 18 locations. As can be seen, as the number of measurements increase, the uncertainty improves or is reduced.

Figure 17:
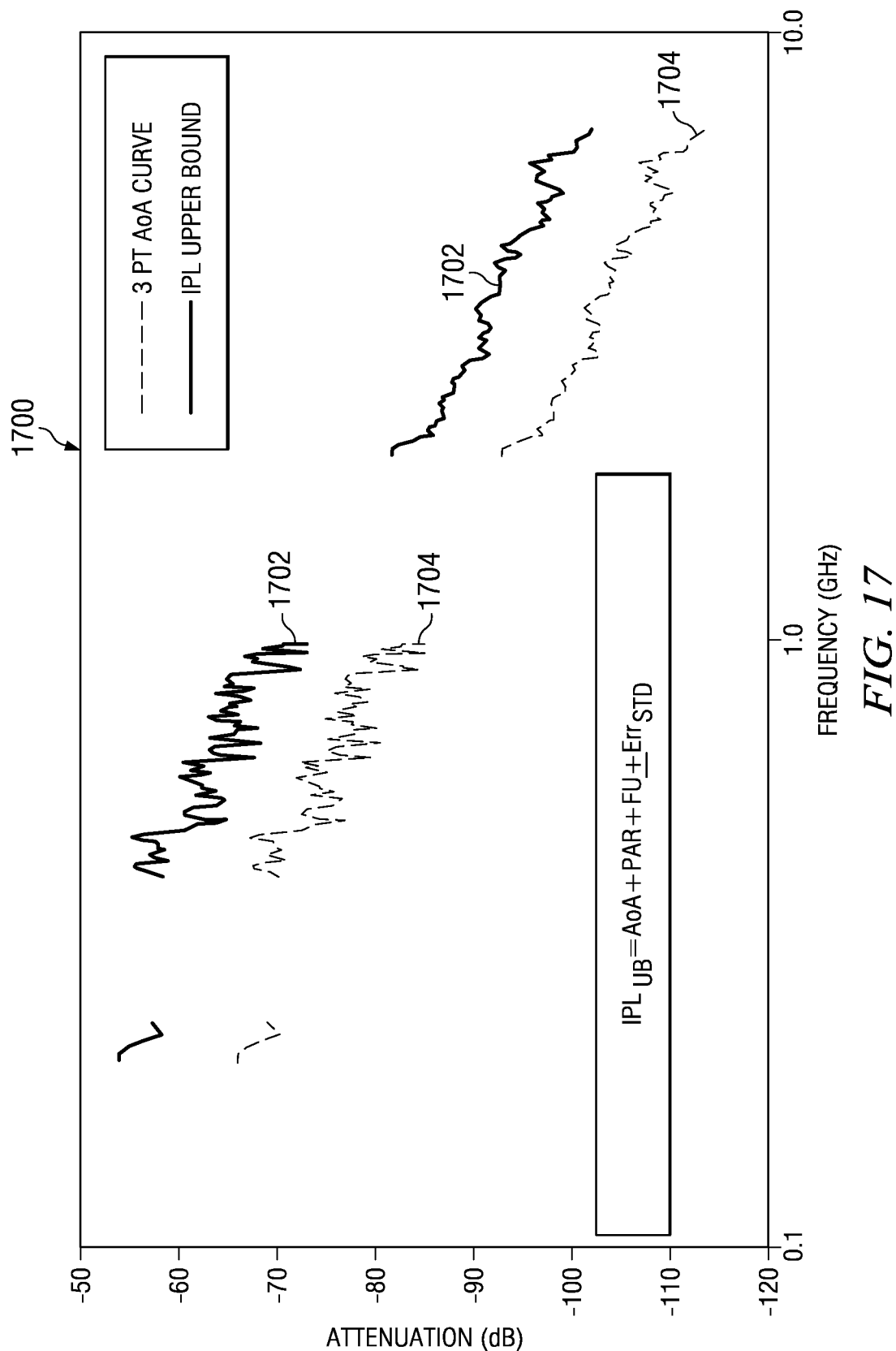
FIG. 17 is a diagram illustrating predictions of an upper bound for attenuation or interference path loss in accordance with an advantageous embodiment.

With reference now to FIG. 17, a diagram illustrating predictions of an upper bound for attenuation or interference path loss is depicted in accordance with an advantageous embodiment. In this example, graph 1700 illustrates an upper bound for interference path loss or attenuation based on measurements made in 3 locations. In this example, the data is illustrated with attenuation on the y-axis, and frequency on the x-axis. Line 1702 identifies the predicted upper bound. This line may be generated in operation 1014 in FIG. 10.

Line 1704 illustrates an average of averages curve generated from the 3 measurements. In this example, PAR is around 3 dB in the low band and around 6.7 dB in the high band. FU is around 8 dB in the low band and around 4.5 dB in the high band. $Err_{STD}$ has a bound of around 2.5 dB in the low band and around 1.5 dB in the high band.

Thus, the different advantageous embodiments provide a method and apparatus for identifying attenuation in cavities or enclosures. In the different advantageous embodiments, a worst case attenuation or interference path loss may be identified for an interior of an aircraft. The different advantageous embodiments may reduce the time and cost needed to perform these measurements. These features may be provided through the use of discrete frequency stirring.

This type of process allows for a statistical measurement approach with repeatable and accurate results. By using discrete frequency stirring, the number of measurement points may be reduced while maintaining a sufficient degree of confidence that inaccurate attenuation is identified. Further, even with less test locations, the different advantageous embodiments may provide for a more thorough or more accurate assessment of attenuation that may occur within the interior of an aircraft.

Also, the different advantageous embodiments do not require prior knowledge of the worst case attenuation or coupling aperture as in currently employed methods. As a result, a more thorough assessment of different coupling or attenuation paths may be identified. The different advantageous embodiments apply a statistically uniform field, such that strong contributions from unexpected apertures or effects of the combination of multiple apertures may be evaluated.

Further, as described above, the different advantageous embodiments do not attempt to measure the worst case attenuation but identifies it through statistical analysis from test data.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

Some of the block may represent operations performed by a user or person. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

The description of the different advantageous embodiments has been presented for purposes of illustration and description, and is not intended to be exhaustive or limited to the embodiments in the form disclosed. Many modifications and variations will be apparent to those of ordinary skill in the art. The different advantageous embodiments may be applied to testing and identifying attenuation losses in structures other than an aircraft.

For example, the different advantageous embodiments may be applied to other structures such as, for example, buildings, work facilities, manufacturing plants, tanks, spacecraft, submarines, trains, and other suitable structures. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for assessing aircraft interference path loss in an aircraft, the method comprising:
   transmitting a plurality of radio frequency signals that are stepped through a plurality of frequencies in a frequency range from a plurality of locations within an interior of the aircraft;
   measuring received radio frequency signals generated at a receive antenna in response to transmitting the plurality of radio frequency signals to form a plurality of measurements;
   performing an autocorrelation check on the plurality of measurements to determine whether a desired sample independence is present or absent;
   responsive to the desired sample independence being absent, adjusting a frequency step size to step through a plurality of frequencies for the plurality of radio frequency signals to obtain the desired sample independence;
   generating an average of averages curve from the plurality of measurements;
   identifying a peak to average ratio from the average of averages curve;
   identifying field uniformity from the plurality of measurements;
   determining a standard error for the average of averages curve; and
   predicting an upper bound for the aircraft interference path loss in the zone within the aircraft using the average of averages curve, the peak to average ratio, the field uniformity, and the standard error.

2. The method of claim 1, wherein the transmitting step comprises:
   broadcasting a radio frequency signal at a frequency from a location within the plurality of locations;
   incrementing the frequency by a step size to form a new frequency;
   transmitting a new radio frequency signal from the location at the new frequency within the plurality of locations;
   repeating the incrementing and transmitting step until the plurality of frequencies has been used to transmit the new radio frequency signal; and
   repeating the broadcasting, incrementing, transmitting, and repeating steps for each location within the plurality of locations.

3. The method of claim 1 further comprising:
   selecting a stirring bandwidth for the plurality of frequencies such that an average field value is consistent within the stirring bandwidth.

4. The method of claim 1, wherein the step of identifying the peak to average ratio comprises:
   calculating a difference between the average of averages curve and an average of peaks curve.

5. The method of claim 1 further comprising:
   identifying a standard deviation from average values of signal strength, wherein the standard deviation is used to identify field uniformity.

6. The method of claim 1, wherein the receive antenna is located on an external location of the aircraft.

7. The method of claim 1 further comprising:
   determining whether the upper bound for the aircraft interference path loss in the aircraft meets a requirement; and
   responsive to the upper bound for the aircraft interference path loss in the aircraft meeting the requirement, certifying the aircraft as meeting the requirement.

8. The method of claim 1, wherein the plurality of locations is located within a set of zones in the aircraft.

9. The method of claim 1 further comprising:
   identifying a test setup for the aircraft to assess the aircraft interference path loss in the aircraft prior to transmitting the plurality of radio frequency signals.

10. An apparatus comprising:
    a set of receive antennas;
    a set of transmit antennas; and
    a radio frequency control system of configured to
      transmit a plurality of radio frequency signals that are stepped through a plurality of frequencies in a frequency range for the set of transmit antennas from a plurality of locations within an interior of an aircraft;
      measure received electromagnetic signals generated at the set of receive antennas in response to transmitting the plurality of radio frequency signals to form a plurality of measurements;
      perform an autocorrelation check on the plurality of measurements to determine whether a desired sample independence is present or absent;
      adjust, in response to the desired sample independence being absent, a frequency step size to step through a plurality of frequencies for the plurality of electromagnetic signals to obtain the desired sample independence;
      generate an average of averages curve from the plurality of measurements;

identify a peak to average ratio from the average of averages curve;
identify field uniformity from the plurality of measurements;
determine a standard error for the average of averages curve; and
predict an upper bound for the aircraft interference path loss in the zone within the aircraft using the average of averages curve, the peak to average ratio, the field uniformity, and the standard error.

* * * * *